United States Patent

[11] 3,621,021

| [72] | Inventors | Bernard Miller<br>Plainsboro;<br>Jackson Pollard English, Princeton, both of N.J. |
|---|---|---|
| [21] | Appl. No. | 658,598 |
| [22] | Filed | Aug. 7, 1967 |
| [45] | Patented | Nov. 16, 1971 |
| [73] | Assignee | American Cyanamid Company<br>Stamford, Conn. |

[54] QUINOXALINYL N⁴-OXIDE PHOSPHATES, METHODS OF PREPARATION AND USE OF SAME AS PESTICIDES
6 Claims, No Drawings

[52] U.S. Cl. .................................................. 260/250, 424/200
[51] Int. Cl. .................................................. C07d 51/76
[50] Field of Search ............................................ 260/250

[56] References Cited
UNITED STATES PATENTS

| 2,922,791 | 1/1960 | Rockett ................ | 260/294.8 |
| 2,503,390 | 4/1950 | Jelinek ................ | 167/30 |
| 2,686,786 | 8/1954 | Shaw .................. | 260/294.8 |

FOREIGN PATENTS

| 666,596 | 2/1953 | Great Britain ............ | 260/290 |

*Primary Examiner*—Nicholas S. Rizzo
*Attorney*—Harry H. Kline

ABSTRACT: Novel quinoxalinyl N⁴-oxide phosphates together with their preparation and use for controlling insects and arachnids are disclosed. They have the formula:

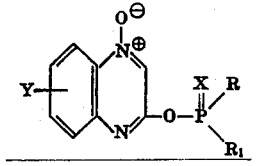

wherein R and $R_1$ each are selected from the group consisting of lower alkyl, lower alkoxy, lower alkylthio, phenyl, halo-substituted phenyl, lower alkyl-substituted phenyl, and $NR_2$ groups wherein $R_2$ is hydrogen or lower alkyl; X is sulfur or oxygen; and Y is hydrogen, halogen, lower alkyl or lower alkoxy.

3,621,021

QUINOXALINYL N⁴-OXIDE PHOSPHATES, METHODS OF PREPARATION AND USE OF SAME AS PESTICIDES

The present invention relates to novel quinoxalinyl N⁴-oxide phosphates, a process for the preparation thereof, and the use of such compounds for controlling insects and arachnids. More particularly, the invention relates to new quinoxalinyl N⁴-oxide phosphates having the formula:

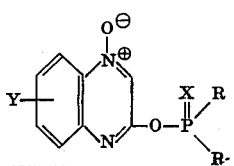

wherein R and R₁ each are selected from the group consisting of lower alkyl, lower alkoxy, lower alkylthio, phenyl, halo-substituted phenyl, lower alkyl-substituted phenyl, and NR₂ groups wherein R₂ is hydrogen or lower alkyl; X is sulfur or oxygen; and Y is hydrogen, halogen, lower alkyl or lower alkoxy. The invention further relates to a process for the preparation of the above-characterized compounds and to the application of the same on plant life for the control of insects and arachnids.

Illustrative compounds contemplated by the invention are, for instance:
Diethyl 2-quinoxalinyl N⁴-oxide phosphate,
0-methyl  0-ethyl  0-2-quinoxalinyl  N⁴-oxide phosphorothioate,
0-methyl  0-2-quinoxalinyl  N⁴-oxide phenylphosphonothioate,
N,N-diethyl  0-methyl  0-2-quinoxalinyl  N⁴-oxide phosphoramidate,
0,0-dimethyl 0-2-quinoxalinyl N⁴-oxide phosphorothioate,
0,0-diethyl 0-2-quinoxalinyl N⁴-oxide phosphorothioate,
0,2-methyl-2-quinoxalinyl N⁴-oxide phosphorothioate,
0,0-dimethyl  0-6-methyl-2-quinoxalinyl  N⁴-oxide phosphorothioate,
0,0-dimethyl  0-6-chloro-2-quinoxalinyl  N⁴-oxide phosphorothioate,
0,0-diethyl  0-8-chloro-2-quinoxalinyl  N⁴-oxide phosphorothioate,
and
N,N-dimethyl  0-ethyl  0-2-quinoxalinyl  N⁴-oxide phosphorothioamidate.

Advantageously, the compounds of the invention can be prepared conveniently by a plurality of reactions. These include reacting a 2-nitroaniline of the formula:

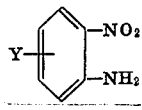

wherein Y is hydrogen, halogen, lower alkyl or lower alkoxy, with diketene, preferably in the presence of mercuric acetate or other suitable mercury salts, to yield a nitroacetoacetanilide of the formula:

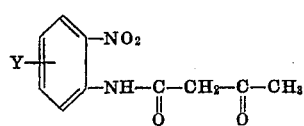

which, when treated with a strong base, such as potassium or sodium hydroxide, yields a quinoxalinone N⁴-oxide having the

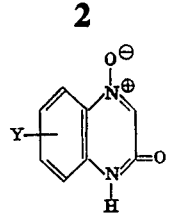

Reaction of the latter quinoxalinone N⁴-oxide with a halogenated phosphorylating agent of the formula:

wherein Z is a halogen, yields the quinoxalinyl N⁴-oxide phosphate of the invention represented by the formula:

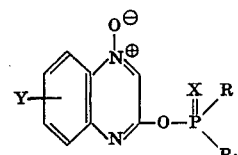

wherein R, R₁, X and Y are defined above.

Graphically, the above overall reactions may be shown as follows:

(I)

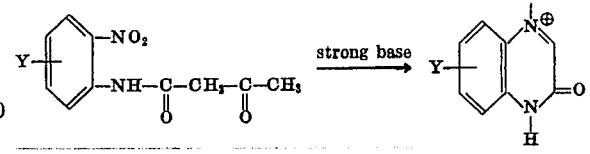

(II)

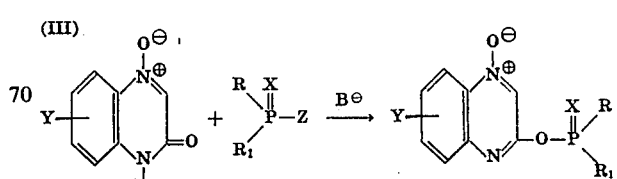

(III)

In the preparation of the nitroacetoacetanilide in step (I) above, it is desirable to disperse the nitroaniline reactant in a solvent, such as acetic acid or acetone, and conduct the reaction with the diketene in the presence of mercuric acetate or other equivalent mercury salts and a ketonic solvent, such as acetone, methyl ethyl ketone or methyl isobutyl ketone. The reaction may be carried out at between about 0° and 100° C., but is preferably held at between about 25° and 60° C. Resultant nitroacetoacetanilide may then be separated from the reaction mixture by any known means, such as filtration or centrifugation, then washed with water and treated with a strong base, such as sodium hydroxide, potassium hydroxide and equivalents thereof, preferably as an aqueous solution. A cyclized product, namely, the quinoxalinone $N^4$-oxide is obtained. For cyclization, reaction temperatures are generally carried out at an elevated temperature between about 30°C. and 100° C. Treatment of the quinoxalinone $N^4$-oxide with a strong base, such as potassium t-butoxide and an organic solvent, such as dimethylsulfoxide or dimethylformamide, followed by phosphorylation at between 0° and 70° C. with a halogenated phosphorylating agent yields the desired quinoxalinyl $N^4$-oxide phosphate or thiophosphate as above defined.

Exemplary nitroanilines employed in step (I) include:
2-nitroaniline,
4-chloro-2-nitroaniline,
2-nitro-p-toluidine,
6-chloro-2-nitroaniline,
4-methoxy-2-nitroaniline,
4-ethoxy-2-nitroaniline, and
4-ethyl-2-nitroaniline.

Illustrative typical phosphorylating compounds employed in step (III) are, for instance:
0,0-dimethyl phosphorochloridothioate,
0,0-diethyl phosphorochloridothioate,
0-methyl-0-ethyl phosphorochloridothioate,
0,0-diisopropyl phosphorobromidothioate,
0,0-di-n-butyl phosphorochloridothioate,
0,0-dimethyl phosphorochloridate,
0,0-diethyl phosphorochloridate,
0-ethyl ethanephosphonochloridothioate,
0-ethyl-N,N-dimethyl phosphoramidochloridothioate,
0-ethyl phenylphosphonochloridothioate,
0-ethyl-N-isopropyl phosphoramidochloridothioate,
0-ethyl-N-methyl phosphoramidochloridothioate,
S,S-diethyl phosphorochloridotrithioate, and
Diethylphosphinothioyl bromide.

The compounds of the present invention are excellent insecticides and arachnicides. They are applied to either plant foliage or to an area in which plants are grown to protect them against the ravages of a variety of insects and arachnids. Further, they are effective against both the adult and larval stages of insects possessing both systemic activity and a low order of mammalian toxicity as well as nonphytotoxicity at pesticidally effective rates. Advantageously, the compounds of the invention lend themselves to use with LV (e.g., Low Volume) and ULV (e.g., Ultra Low Volume) dispersing equipment as well as with conventional application equipment.

In general, the compounds of the invention may be employed in solid or liquid form. They may be used as dusts, dust concentrates, wettable powders, emulsifiable concentrates, granular formulations, and as low volume and ultra low volume concentrates (hereinafter referred to as LV and ULV concentrates, respectively).

Solid formulations, such as dusts, dust concentrates, and wettable powders are readily prepared by admixing usually about 25percent to 95 percent by weight of the active compound with about 5 to 75 percent by weight of a finely divided carrier, such as attapulgite, kaolin, diatomaceous earth, silica, talc, and the like. A small amount, usually about 0.2 to 2.0 percent, by weight, of a surfactant may also be added, if desired. Wettable powders are made in essentially the same manner as the solids but usually about 0.2 to 2.0 percent by weight of an emulsifying agent is added to the formulation and the wettable powder is dispersed in water and applied as a liquid spray. Among the emulsifying agents useful in the above preparation are the alkyl and aryl sulfonates, polyoxyalkylenefatty acid esters, and polyglycol ethers. These emulsifying agents may also be used in the preparation of the emulsifiable concentrate formulations. In these formulations the active ingredient is generally dissolved in an organic solvent, such as lower alkanol, benzene, acetone, methyl ethyl ketone, cyclohexanone, or the like, with a small amount of emulsifier added. The concentrate is usually then dispersed in water just prior to application.

For LV and ULV applications, the compound may be directly applied as a technical grade liquid. Alternatively, where the compound is a solid, it is dissolved in a small amount of a relatively nonvolatile solvent having a flash point above about 125° F.; a specific gravity at 60°/60° F. exceeding about 0.888; and an evaporation rate not exceeding 25 percent in 6 hours at 25° C. and 48 percent relative humidity, such as "Panasol," and applied as such. Further, malathion, chemically identified as 0,0-dimethyl phosphorodithioate of diethyl mercaptosuccinate, and heavy aromatic solvents having a mixed aniline point of 95° F. or below and aromatic content above 60 percent are excellent solvents or diluents for this purpose. In these LV and ULV applications, the concentrate is applied as a finely divided mist or spray, generally with aerial application equipment.

The invention may be further understood by referring to the examples set forth below, which are to be taken as merely illustrative. They are not intended to be construed as limitative. All parts are by weight unless otherwise stated.

EXAMPLE 1

Preparation of 4'-Chloro-2'-Nitroacetoacetanilide

In a suitable reaction vessel 34.5 parts of 4-chloro-2-nitroaniline are suspended in 60 parts (by volume) of glacial acetic acid. 1.3 parts of mercuric acetate and 44 parts (by volume) of a 50 percent solution of diketene in acetone were added and the mixture stirred at 25° C. for 5 minutes. An additional 2 parts of mercuric acetate are then added. The temperature rises to 44° C. after 40 minutes. The mixture is next cooled to 30° C. and then allowed to stand at room temperature for 2 days. 100 parts (by volume) of water are added to the stirred mixture which is allowed to settle. The water is poured off and the residual solids dissolved in methanol and crystallized by the addition of water. The yield is 29.5 parts, equivalent to 57.5 percent of theoretical, having a melting point of between 81° and 83.5° C.

EXAMPLE 2

Repeating the procedure of example 1 in every detail except that 4-chloro-2-nitroaniline is substituted for 2-nitro-p-toluidine in the above example, a 57percent yield of 4'-methyl-2'-nitroacetoacetanilide, melting point 99° –100° C., is obtained. The structure of this product is confirmed by its NMR spectra.

EXAMPLE 3

Substituting 6-chloro-2-nitroaniline for 4-chloro-2-nitroaniline in the procedure of example 1 above, there is obtained a 62 percent yield of 6'-chloro-2'-nitroacetoacetanilide, melting point equal to 145°–146° C. The structure is confirmed by NMR spectra.

EXAMPLE 4

Preparation of 6-Methyl-2-Quinoxalinone $N^4$-oxide

To a suitable reaction vessel are added 8.4 parts of 2'-nitro-

4'-methylacetoacetanilide. The latter is then suspended in 150 parts (by volume) of 18 percent aqueous potassium hydroxide solution. The mixture is next stirred at 55°–60° C. for three-fourths of an hour, and then heated to 75°–80° C. for one-half hour. It is then allowed to cool and stand overnight at room temperature. The mixture is extracted with chloroform and the aqueous layer is diluted to 400 parts (by volume) and acidified with dilute hydrochloric acid. A brown precipitate forms and is filtered off and washed with dilute sodium bicarbonate solution. It is then dissolved in 1N sodium hydroxide and reprecipitated with 1N hydrochloric acid to yield 5.7 parts, equal to 92 percent of theoretical, of a dark brown solid. Recrystallization from acetic acid does not appear to change its infrared spectrum.

EXAMPLE 5

Preparation of 6-chloro-2-quinoxalinone $N^4$-oxide

The procedure of example 4 is followed in every detail except that 2'-nitro-4'-chloroacetoacetanilide is reacted with aqueous sodium hydroxide to yield an 89 percent yield of 6-chloro-2-quinoxalinone $N^4$-oxide.

EXAMPLE 6

Repeating the procedure of example 4 in every detail except that 8-chloro-2-quinoxalinone $N^4$-oxide having a melting point of 259°–260° C. (dec.) in a 75percent yield is obtained employing 6'-chloro-2'-nitroacetoacetanilide in lieu of 2'-nitro-4'-methylacetoacetanilide.

EXAMPLE 7

Preparation of 0,0-Demethyl 0-2-quinoxalinyl $N^4$-oxide Phosphorothioate 5.0 parts of quinoxalinone $N^4$-oxide are suspended in 75 parts (by volume) of dimethylsulfoxide in a suitable reaction vessel. 3.50 parts of potassium t-butoxide are added to give a dark red solution which is cooled in ice. Next, 5.1 parts of 0.0-dimethyl phosphorochloridothioate are added rapidly. After 1 minute, the solution is neutral in pH. It is poured onto a mixture of ice water and methylene chloride. The organic layer is washed three time with water, dried over magnesium sulfate and then evaporated to yield 5.8 parts of dark red oil. The latter is chromatographed on magnesium silicate to give 3.7 parts of pale red solid. Recrystallization from carbon tetrachloride yields 2.4 parts of pale orange solid, possessing a melting point equal to 97°–98.5° C., and 0.4 part of pale yellow solid, having a melting point equal to 98°–99° C.

Analysis (in percent): Calcd. for $PN_2SO_4C_{10}H_{11}$:
Calcd: P, 10.83; N, 9.79; S, 11.6; C, 41.9; H, 3.84
Found: P, 10.64; N, 9.53; S, 11,24; C, 41.8; H, 4.09

EXAMPLE 8

Preparation of 0,0-Diethyl 0.2-quinoxalinyl $N^4$-oxide Phosphorothioate

The procedure of example 7 is repeated in every detail, except that 3.0 parts of quinoxalinone $N^4$-oxide, 2.10 parts of potassium t-butoxide, and 3.50 parts of 0,0-diethyl phosphorochloridothioate are employed as reactants. Chromatography on magnesium silicate yields 1.90 parts of an orange solid. Recrystallization from petroleum ether yields 0.2 part of solid, having a melting point equal to 54°–56° C., and 0.8 part having a melting point of 52°–55° C.

Analysis (in percent): Calcd. for $PN_2SO_4C_{12}H_{15}$:
Calcd: P, 9.87; N, 8,92; S, 10.2; C, 45.9; H, 4.78
Found: P, 9.67; N, 8.80; S, 10.3; C, 45.1 H, 4.84

EXAMPLE 9

Preparation of 0,0-dimethyl 0-6-methyl-2-quinoxalinyl $N^4$-oxide Phosphorothioate Repeating the procedure of example 7 in every detail, there is obtained a good yield of the above-named compound having a melting point of 124°–125.5° C. by substituting 6-methyl-2-quinoxalinone $N^4$-oxide for quinoxalinone $N^4$-oxide.

Analysis (in percent): Calcd. for $PN_2SO_4C_{11}H_{13}$:
Calcd: P, 10.32; N, 9.33; S, 10.78; C, 44.0; H, 4.36
Found: P, 10.15; N, 9.18; S, 10.81; C, 44.1; H, 4.12

EXAMPLE 10

Preparation of 0,0-diethyl 0-6-chloro-2-quinoxalinyl $N_4$-oxide Phosphorothioate Substituting 6-chloro-2-quinoxalinone $N^4$-oxide for quinoxalinone $N^4$-oxide and 0,0-diethyl phosphorochloridothioate for 0,0-dimethyl phosphorochloridothioate in the process of example 7 and repeating that process in every detail, there is obtained 0,0-diethyl 0-6-chloro-2-quinoxalinyl $N^4$-oxide phosphorothioate possessing a melting point equal to 84°–86° C.

Analysis (in percent): Calcd. for $PN_2SO_4ClC_{12}H_{14}$:
Calcd: P, 8.88; N, 8.03; S, 9.19; Cl, 10.2; C, 41.3; H, 4.05
Found: P, 8.73; N, 8.06; S, 8.59; Cl, 9.87; C, 43.6; H, 4.00

EXAMPLE 11

Preparation of 0,0-diethyl 0-6-methyl -2-quinoxalinyl $N^4$-oxide Phosphorothioate Following the procedure of example 7 in every detail, 6-methyl-2-quinoxalinone $N^4$-oxide is reacted with 0.0-diethyl phosphorochloridothioate yielding 0,0-diethyl 0-6-methyl-2-quinoxalinyl $N^4$-oxide phosphorothioate whose melting point is equal to 86.5°–87.5° C.

Analysis (in percent): Calcd. for $PN_2SO_4C_{13}H_{17}$:
Calcd: P, 9,43; N, 8.53; S, 9.77; C, 47,6; H, 5.22
Found: P, 9.54; N, 8.6l; S, 10.24; C, 48.5; H, 5.41

EXAMPLE 12 Preparation of 0,0-diethyl 0-8-chloro-2-quinoxalinyl $N^4$-oxide Phosphorothioate The reaction of 8-chloro-2-quinoxalinone $N^4$-oxide with 0,0-diethyl phosphorochloridothioate in accordance with the process of example 7 yields the above-named compound having a melting point equal to 102.5°–104° C.

Analysis (in percent): Calcd. for $PN_2SO_4ClC_{12}H_{14}$:
Calcd: P, 8.88; N, 8,03; S, 9.19; Cl, 10.17; C, 41.3; H, 4.05
Found: P, 8.81; N, 8.06; S, 9.23; Cl, 10.28; C, 41.4; H, 4.12

EXAMPLE 13

Preparation of Diethyl 2-quinoxalinyl $N_4$-oxide Phosphate

The above name compound whose melting point is 63.0°–64.5° C. is prepared using the process of example 7 by quinoxalinone $N^4$-oxide with diethyl phosphorochloridate.

Analysis (in percent): Calcd. for $PN_2O_5C_{12}H_{15}$:
Calcd: P, 10.41; N, 9.40; C, 48.3; H, 5.04
Found: P, 10.41; N, 9.39; C, 48.4; H, 5.08

EXAMPLE 14

Preparation of Diisopropyl 2-quinoxalinyl $N^4$-oxide Phosphate

Following the process of example 13 but substituting 0,0-diisopropyl phosphorochloridate for 0.0-diethyl phosphorochloridate yields the above-named compound whose melting point equals 108.5°–110° C.

Analysis (in percent); Calcd. for $PN_2O_5C_{14}H_{19}$:
Calcd: P, 9.51; N, 8.60; C, 51.5; H, 4.30
Found: P, 9.76; N, 8.55; C, 51.6; H, 4.95

EXAMPLE 15 Preparation of 0,0-diisopropyl 0-2-quinoxalinyl $N^4$-oxide Phosphorothioate The procedure of example 7 is repeated in every detail except that 0,0-diisopropyl phosphorochloridothioate is employed in place of 0,0-dimethyl phosphorochloridothioate to obtain a good yield of the above-named product whose melting point is 76.5°–78.0° C.

Analysis (in percent); Calcd. for $PN_2SO_4C_{14}H_{19}$:
Calcd: P, 9.07; N, 8.18; S, 9.36; C, 49.2; H, 5.56
Found: P, 8.97; N, 8.18; S, 9.38; C, 49.3; H, 5.66

EXAMPLE 16

The insecticidal activity of the compounds of the invention is illustrated by the following tests wherein the procedures employed and the results are set forth below.

Bean Aphid - *Aphis Fabae* Scopoli

Representative compounds are tested as 0.1 percent, 0.01 percent, and 0.001 percent solutions or suspensions in 65 percent acetone/35 percent water. 2-inch fiber pots, each containing a nasturtium plant two inches high and infested with about 150 aphids two days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for two days at 70° F., and 50 percent R.H.

Southern Armyworm - *Prodenia Eridania* (Cramer)

The 0.1 percent and 0.01 percent solutions from the aphid test are also used for this test. Sieva lima bean primary leaves are dipped for three seconds in the test solution and set in a hood on a screen to dry. When dry, each leaf is placed in a 4-inch petri dish which has a moist filter paper in the bottom and 10 third-instar armyworm larvae about three-eighths inch long. The dishes are covered and held at 80° F., and 60 percent R.H. After two days, mortality counts and estimates of the amount of feeding are made. Compounds showing partial kill and/or inhibition of feeding are held an extra day for further observations.

Confused Flour Beetle - *Tribolium Confusum* Jacquelin DuVal

Compounds are formulated as 1 percent dusts by mixing 0.1 part of the compound with 9.9 parts of talc, wetting with 5 parts (by volume) of acetone and grinding with a mortar and pestle until dry. One hundred and twenty-five mg. of this 1 percent dust are then blown into the top of a dust settling tower with a short blast of air. The dust is allowed to settle on 4-inch petri dishes for two minutes, giving a deposit of approximately 87 mg./sq. foot of the 1 percent dust. The dishes are removed and 25 adult confused beetles are added immediately. The dishes are held for 3 days at 80° F. and 60 percent R.H. following which mortality counts are made.

Large Milkweed Bug - *Oncopeltus Fasciatus* Dallas

The 1 percent dusts described above are used in this test. 25 mg. of the 1 percent dusts are sprinkled evenly over the glass bottom of a 7-inch diameter cage giving a deposit of approximately 94 mg./sq. foot of the 1 percent dust. Water is supplied in a a 2-ounce bottle with a cotton wick, 20 adult bugs are added and a screen cover placed on the top. Mortality counts are made after holding for 3 days at 80° F. and 60 percent R.H.

German Cockroach - *Blattella germanica* (Linneaus)

The procedure is the same as for the large milkweed bug test, except that in this test only adult males are used.

Housefly - *Musca domestica* Linnaeus

Groups of 25 adult female houseflies are lightly anesthetized with carbon dioxide, place in wide-mouth pint mason jars, and covered with a screen cap. The test compound is formulated as an emulsion containing 50 p.p.m. of test material, an emulsifier, acetone, and water. The mouth of the vial is covered with a single layer of cheesecloth, inverted and placed on the screen cap so that the flies can feed on the solution through the screen. Mortality counts are made after 2 days at 80° F.

Southern Corn Rootworm - *Diabrotica undecimpunctata howardi* Barber

The compound in test is formulated as a dust and incorporated into soil at the equivalent of 50 pounds per acre. The soil is subsampled into bottles, and 10 6- to 8-day old rootworm larvae added to each bottle, which is then capped. Mortality counts are made after 6 days at 80° F., 60 percent R.H.

The results are presented in tabular form in table I below.

TABLE I

| Compound | Bean aphid 0.1% | 0.01% | 0.001% | Southern armyworm 0.1% | 0.01% | $TC,^1$ 1% | $MB,^2$ 1% | $GC,^3$ 1% | Housefly, 50 p.p.m. | Southern corn rootworm, 50 lbs./acre |
|---|---|---|---|---|---|---|---|---|---|---|
| quinoxaline di-N-oxide, O—P(S)(OC$_2$H$_5$)$_2$ | 100 | 100 | 100 | 100 | 100 | 100 | 100 | 100 | 100 | 100 |
| quinoxaline di-N-oxide, O—P(S)(OCH$_3$)$_2$ | 100 | 100 | 100 | 100 | 100 | 100 | 90 | 100 | 100 | 100 |
| CH$_3$-substituted quinoxaline di-N-oxide, O—P(S)(OC$_2$H$_5$)$_2$ | 100 | 100 | 80 | 100 | 90 | 100 | 95 | 100 | 100 | 100 |
| Cl-substituted quinoxaline di-N-oxide, O—P(S)(OC$_2$H$_5$)$_2$ | 100 | 100 | 100 | 100 | 100 | 100 | 80 | 100 | 100 | 100 |

TABLE I—Continued

| Compound | Bean aphid 0.1% | 0.01% | 0.001% | Southern armyworm 0.1% | 0.01% | TC,[1] 1% | MB,[2] 1% | GC,[3] 1% | Housefly, 50 p.p.m. | Southern corn rootworm, 50 lbs./acre |
|---|---|---|---|---|---|---|---|---|---|---|
| 6-CH₃-quinoxaline-N-oxide-O-P(S)(OCH₃)₂ | 100 | 100 | 100 | 100 | 50 | 100 | 20 | 35 | 68 | 100 |
| quinoxaline-N-oxide-O-P(O)(OC₂H₅)₂ | 100 | 100 | 100 | 100 | 100 | 100 | 100 | 100 | 100 | 100 |
| quinoxaline-N-oxide-O-P(O)(OC₃H₇)₂ | 100 | 100 | 50 | 30 | 0 | 50 | 100 | 60 | 100 | 100 |
| quinoxaline-N-oxide-O-P(S)(OC₃H₇)₂ | 100 | 100 | 20 | 100 | 50 | 100 | 55 | 15 | 100 | 100 |
| 6-Cl-quinoxaline-N-oxide-O-P(S)(OC₂H₅)₂ | 100 | 100 | 100 | 100 | 100 | — | — | — | — | — |
| Control | — | — | — | — | — | — | — | — | — | — |

[1] TC = *Tribolium confusum*.  [2] MB = Milkweed bug.  [3] GC = German cockroach.

EXAMPLE 17

The larvicidal activity of illustrative compounds of the invention is shown by the following tests wherein the compounds of the invention are employed against mosquito larvae. The procedure used and results obtained are set forth below in table II.

Common Malaria Mosquito - *Anopheles quadrimaculatus* Say Larvicide Test

Groups of 25 larvae of the common malaria mosquito are transferred with a medicine dropper to a 50 ml. beaker containing 25 ml. of water. The test compound is formulated as an emulsion containing test material, an emulsifier, acetone, and water. This emulsion is diluted with sufficient 65 percent acetone/35 percent water mixture to give 0.4 p.p.m. of active ingredient in solution when the emulsion and water containing the larvae are admixed. Mortality counts are made after 24 hours at 80° F.

TABLE II

| Compound | Mosquito larvae, 0.4 p.p.m. |
|---|---|
| quinoxaline-N-oxide-O-P(S)(OC₂H₅)₂ | 100 |
| quinoxaline-N-oxide-O-P(S)(OCH₃)₂ | 100 |
| 6-CH₃-quinoxaline-N-oxide-O-P(S)(OC₃H₅)₂ | 100 |
| 6-Cl-quinoxaline-N-oxide-O-P(S)(OC₂H₅)₂ | 100 |
| 6-CH₃-quinoxaline-N-oxide-O-P(S)(OCH₃)₂ | 100 |
| quinoxaline-N-oxide-O-P(S)(OC₃H₇)₂ | 100 |

EXAMPLE 18

The miticidal activity of exemplary compounds of the invention is illustrated by the following test using the two-spotted spider mite.

Two-spotted Spider Mite - *Tetranychus urticae* (Koch)

Sieva lima bean plants with primary leaves 3 to 4 inches long are infested with about 100 adult mites per leaf 4 hours before use in this test. The mite and egg infested plants are dipped for 3 seconds in the 0.1 percent, 0.01 percent and 0.001 percent solutions used in the armyworm tests, and the plants set in the hood to dry. They are held for 2 days at 80° F., 60 percent R.H., and the adult mite mortality estimated on one leaf under a stereoscopic microscope. The other leaf is left on the plant an additional 5 days and then examined at 10X power to estimate the kill of eggs and of newly hatched nymphs, giving a measure of ovicidal and residual action, respectively.

The results are summarized in table III below.

TABLE III

| Compound | Two-spotted spider mites | | |
|---|---|---|---|
| | 0.1% | 0.01% | 0.001% |
| quinoxaline N-oxide —O—P(S)(OC$_2$H$_5$)$_2$ | 100 | 100 | 100 |
| quinoxaline N-oxide —O—P(S)(OCH$_3$)$_2$ | 100 | 100 | 100 |
| CH$_3$-quinoxaline N-oxide —O—P(S)(OC$_2$H$_5$)$_2$ | 100 | 81 | 0 |
| Cl-quinoxaline N-oxide —O—P(S)(OC$_2$H$_5$)$_2$ | 100 | 100 | 100 |
| CH$_3$-quinoxaline N-oxide —O—P(S)(OCH$_3$)$_2$ | 90 | 0 | 0 |
| quinoxaline N-oxide —O—P(O)(OC$_2$H$_5$)$_2$ | 100 | 100 | 100 |
| quinoxaline N-oxide —O—P(O)(OC$_3$H$_7$)$_2$ | 100 | 100 | 0 |
| quinoxaline N-oxide —O—P(S)(OC$_3$H$_7$)$_2$ | 100 | 100 | 0 |
| Cl-quinoxaline N-oxide —O—P(S)(OC$_2$H$_5$)$_2$ | 100 | 100 | 100 |

We claim:
1. A compound of the formula:

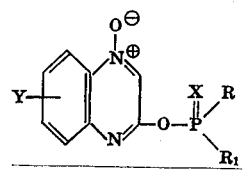

wherein R and R$_1$ are selected from the group consisting of lower alkyl, lower alkoxy, lower alkylthio, phenyl, halophenyl, lower alkylphenyl and NR$_2$ groups wherein R$_2$ is hydrogen, or lower alkyl; X is sulfur or oxygen; and Y is hydrogen, halogen, lower alkyl or lower alkoxy.

2. A compound according to claim 1: 0,0-dimethyl 0-2-quinoxalinyl N$^4$-oxide phosphorothioate.

3. A compound according to claim 1: 0,0-diethyl 0-2-quinoxalinyl N$^4$-oxide phosphorothioate.

4. A compound according to claim 1: 0,0-dimethyl 0-6-methyl-2-quinoxalinyl N$^4$-oxide phosphorothioate.

5. A compound according to claim 1: 0,0-diethyl 0-6-chloro-2-quinoxalinyl N$^4$-oxide phosphorothioate.

6. A compound according to claim 1: diethyl 2-quinoxalinyl N$^4$-oxide phosphate.